US012706819B2

(12) United States Patent
Mock et al.

(10) Patent No.: US 12,706,819 B2
(45) Date of Patent: Aug. 11, 2026

(54) NETWORK ABSTRACTION FOR ENDPOINT DEVICES

(71) Applicant: ITRON, INC., Liberty Lake, WA (US)

(72) Inventors: Christopher Mock, Garner, NC (US); Joseph Martin, Raleigh, NC (US)

(73) Assignee: ITRON, INC., Liberty Lake, WA (US)

( * ) Notice: Subject to any disclaimer, the term of this patent is extended or adjusted under 35 U.S.C. 154(b) by 44 days.

(21) Appl. No.: 18/820,063

(22) Filed: Aug. 29, 2024

(65) Prior Publication Data

US 2026/0067182 A1 Mar. 5, 2026

(51) Int. Cl.
*H04L 43/04* (2022.01)
*H04L 43/20* (2022.01)
*H04W 52/02* (2009.01)

(52) U.S. Cl.
CPC .............. *H04L 43/04* (2013.01); *H04L 43/20* (2022.05); *H04W 52/0258* (2013.01)

(58) Field of Classification Search
None
See application file for complete search history.

(56) References Cited

U.S. PATENT DOCUMENTS 10,673,971 B1 * 6/2020 Hindanov ............. H04L 69/329
2018/0176181 A1 * 6/2018 Fu ........................... H04L 63/10
2020/0100088 A1 * 3/2020 Kim ...................... H04W 48/16

OTHER PUBLICATIONS

International Search Report for Application No. PCT/US2025/043028 dated Oct. 24, 2025.

* cited by examiner

*Primary Examiner* — Atta Khan
(74) *Attorney, Agent, or Firm* — Artegis Law Group, LLP

(57) ABSTRACT

Various embodiments disclose a method comprising, receiving, by a computing device, a first message for transmission to an endpoint from a messaging queue; determining, by the computing device, a first network to which the endpoint is connected; creating, by the computing device, an endpoint object corresponding to the endpoint, the endpoint object being configured with network specific information associated with the first network; receiving, by the endpoint object executing on the computing device from a subnetwork object executing on the computing device, an indication that the message can be delivered to the endpoint via the first network; and in response to the indication, transmitting, by the endpoint object, the first message to the endpoint using the first network.

21 Claims, 5 Drawing Sheets

NETWORK ABSTRACTION FOR ENDPOINT DEVICES

BACKGROUND

Field of the Various Embodiments

The various embodiments relate generally to communications networks, and more specifically, to network abstraction for endpoint devices.

Description of the Related Art

Many networks, such as low-power wide-area networks (LPWANs) and some cellular networks, include large numbers of remote devices. For example, networks that control and/or monitor large infrastructure systems (e.g., power, water, traffic control, and the like) can include many thousands of devices (e.g., valves, metering devices, controllers, and the like). Generally, in such networks each device reports metrology data to endpoint infrastructure management systems, which are tasked with coordinating the operation of the devices. Devices are often deployed in the field so that they communicate with endpoint infrastructure management systems over different networks that are operated by different network providers. These types of networks generally have varying requirements pertaining to network pacing, transport protocols, and security requirements.

BRIEF DESCRIPTION OF THE DRAWINGS

So that the manner in which the features of the various embodiments can be understood in detail, a description of the inventive concepts may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
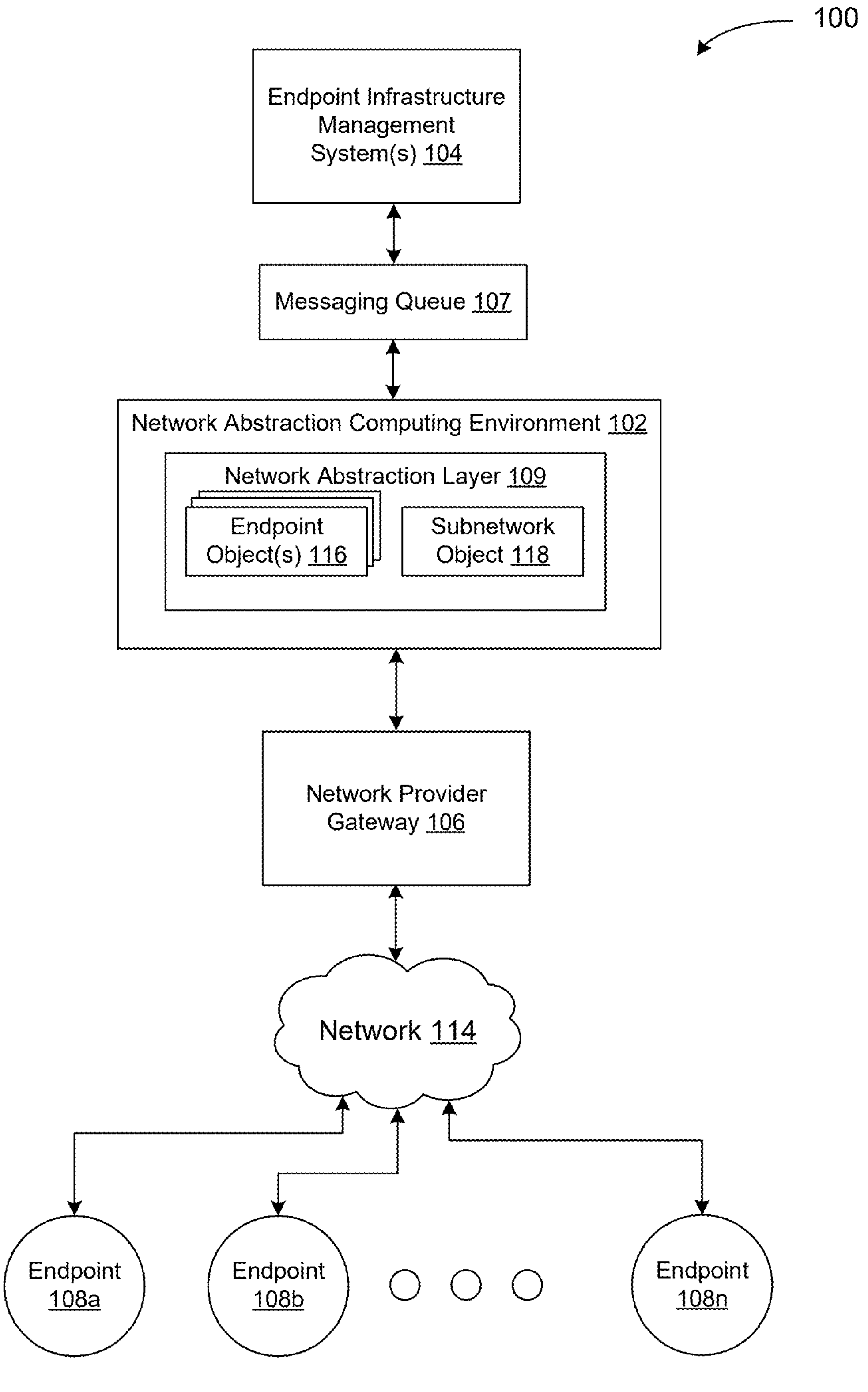
FIG. 1 is a conceptual diagram of the endpoint device network environment, according to various embodiments.

In the following description, numerous specific details are set forth to provide a more thorough understanding of the various embodiments. However, it will be apparent to one of skill in the art that the inventive concepts may be practiced without one or more of these specific details.

Many communications networks link large numbers of endpoint devices, such as power meters, water meters, traffic controllers, and the like, to back-office management systems that monitor and/or control the endpoint devices. To deploy endpoint devices, or meters, over a large geographic area, various networks operated by different network providers under different access conditions are utilized. For example, one endpoint device could be deployed using a long-term evolution (LTE) wireless network provided by a first network provider, while another endpoint device could be deployed using a 5G wireless network provided by a second network provider. The different network providers can have varying network access interfaces and requirements that relate to network pacing, prioritization, supported transport protocols, and security requirements. As the network evolves and integrates additional endpoint devices, additional network providers with even more network access requirements can be utilized to deploy these additional endpoint devices. Accordingly, a given utility provider is often tasked with managing a large network of endpoint devices deployed across a heterogeneous network served by different network providers. Endpoint device management systems are generally focused on monitoring usage data, generating billing data, detecting outages, and other higher-level tasks. Accordingly, tasking endpoint device management systems with navigating various pacing requirements, transport protocols, application programming interfaces (APIs), and security requirements may be undesirable.

To mitigate the impact on and complexity of endpoint device management systems, techniques are disclosed herein that create a network abstraction layer that acts as a communications conduit between endpoint device management systems and endpoint devices that are deployed across one or more different networks provided by one or more network providers. Specifically, according to various embodiments, an endpoint device management system transmits messages to an endpoint device by placing a message into a messaging queue that is monitored by a network abstraction layer. The network abstraction layer determines a destination endpoint device specified by the message retrieved from the messaging queue, the network access requirements associated with the destination endpoint device and/or the network to which the destination endpoint device is connected. The network abstraction layer generates a software representation, called an endpoint object, corresponding to the destination endpoint device and a sender of a message that coordinates messaging to and from the destination endpoint device and manages a connection and/or state for the communications with the destination endpoint device. The network abstraction layer is configured with information that enables communication with the destination endpoint device through a network provider gateway provided by the network provider for accessing the network so that an upstream endpoint device management system need not implement network-specific protocols and requirements imposed by the various network providers to which endpoint devices are connected.

Similarly, when an endpoint device sends messages to an endpoint device management system, communications are funneled through a network abstraction layer that implements network-specific protocols and requirements imposed by a network provider to which the endpoint device is connected. The network abstraction layer receives a payload from an endpoint device and forwards the payload to an endpoint device management system, which can act on the contents of the payload.

At least one technical advantage of the disclosed techniques is that the disclosed techniques enable the endpoint devices to be managed by one or more management systems, such as endpoint device management systems, where the endpoint devices are deployed in a heterogeneous network environment that involves different networks provided by different network providers. Additionally, as new network providers or new types of networks are added to the environment, a network abstraction layer can handle communications via these new networks so that upstream management systems can continue to communicate with endpoint devices using these new network protocols or standards without having to be updated to handle new network protocols or standards.

Endpoint Device Network Environment

FIG. 1 is a conceptual diagram of the operation of an endpoint device network environment 100 that includes, without limitation, a network abstraction computing environment 102, endpoint infrastructure management system 104, a network provider gateway 106, a messaging queue 107, one or more endpoints 108, and a network 114. The network abstraction computing environment 102 includes, without limitation, a network abstraction layer 109. The network abstraction layer 109 includes, without limitation, one or more endpoint objects 116 and a subnetwork object 118. The endpoints 108 can include utility metering devices that track utility usage or any other type of endpoint device attached to the network 114, such as smart streetlights or other IoT devices.

Endpoint infrastructure management system 104 represents one or more computing devices, services, or systems through which endpoints 108 of a utility distribution infrastructure are managed and in which usage of a utility commodity for users associated with the endpoints 108 is stored for various purposes such as billing, outage detection, regulatory or legal compliance, and other uses. Endpoint infrastructure management system 104 communicates with endpoints 108 via network abstraction computing environment 102. Endpoint infrastructure management system 104 can also manage other types of endpoints or IoT devices.

Network abstraction computing environment 102 represents one or more computing devices, services, or systems through which the endpoint infrastructure management system 104 communicates with endpoints 108. The network abstraction computing environment 102 routes messages from the endpoint infrastructure management system 104 to an endpoint 108 and routes communications from an endpoint 108 to the endpoint infrastructure management system 104. The network abstraction computing environment 102 operates as a communications conduit through which messages between the endpoint infrastructure management system 104 and an endpoint 108 are exchanged.

To transmit a message to an endpoint 108, the endpoint infrastructure management system 104 places the message onto the messaging queue 107 utilized by the network abstraction computing environment 102. The network abstraction layer 109 retrieves messages from the messaging queue 107 in a first-in first-out (FIFO) order. In some implementations, the network abstraction layer 109 alternatively retrieves messages that are flagged with a higher priority before messages that are not flagged as high priority. In other implementations messages are retrieved from messaging queue 107 in bulk and loaded into an endpoint object 116 corresponding to an endpoint 108 in an ordered fashion according to a message priority.

A message retrieved from the messaging queue 107 includes an identifier of the endpoint 108, such as an International Mobile Equipment Identity (IMEI), a device identifier, or a key that uniquely identifies the endpoint 108. Upon receiving a message into the messaging queue 107, the network abstraction computing environment 102 selects the network abstraction layer 109 corresponding to a network 114 to which the endpoint 108 is connected based on the identifier of the endpoint 108. The network abstraction layer 109 is created by the network abstraction computing environment 102 to correspond to a particular network 114 to which endpoints 108 are connected or on which endpoints 108 are located. The network abstraction layer 109 is specific to network 114 and the policies, protocols, and security requirements of network 114. The network abstraction layer 109 then creates an endpoint object 116 corresponding to the endpoint 108. The endpoint object 116 is a software component that performs, among other tasks, delivery of the message to the endpoint 108 and also receives messages from the endpoint 108 that can be forwarded to the endpoint infrastructure management system 104. In some examples, network abstraction layer 109 creates a new endpoint object 116 corresponding to an endpoint 108 the first time a request targeting the endpoint 108 is received. In one implementation, once an endpoint object 116 is created for an endpoint 108, the endpoint object 116 is retained in memory or storage. In some examples, network abstraction layer 109 creates a new endpoint object 116 for a meter each time the endpoint infrastructure management system 104 requests delivery of a message to a respective endpoint 108. In other examples, the network abstraction computing environment 102 selects an endpoint object 116 from a pool of endpoint objects 116 or reuses a previously created endpoint object 116 that was created for a different endpoint 108 or a different message exchange between that endpoint 108 and the endpoint infrastructure management system 104.

The subnetwork object 118 is a software component that works in conjunction with endpoint object 116 to perform delivery of message to an endpoint 108. The subnetwork object 118 is created by the network abstraction layer 109 and represents the state of a particular portion of network 114, such as a tower, access point, subnetwork, or other portion or segment of network 114. The subnetwork object 118 implements message pacing to pace packets sent to the endpoint 108 via network 114 according to network pacing requirements imposed by the network provider and the current state of a portion of network 114. The endpoint object 116 corresponds to an endpoint 108, and the subnetwork object 118 corresponds to a particular portion of network 114, such as a tower, access point, subnet, or other portion of a network 114 that is associated with network pacing requirements. In some embodiments (not shown), the network abstraction layer 109 includes multiple subnetwork objects 118 that correspond to different portions of network 114 and/or for other networks (not shown).

The endpoint object 116 identifies a portion of the network 114 on which a particular endpoint 108 exists based upon the identifier of the endpoint 108 provided by the endpoint infrastructure management system 104 in the message. In one implementation, the endpoint object 116 is associated with a subnetwork object 118 using information provided by the endpoint infrastructure management system 104. The subnetwork object 118 determines the portion of the network 114 on which an endpoint 108 is deployed based on information from the endpoint infrastructure management system 104. The endpoint object 116 then requests the subnetwork object 118 for the portion of the network to schedule delivery of a message to the endpoint 108, and the subnetwork object 118 determines when the endpoint object 116 is authorized to deliver the message to the endpoint 108 based upon the availability of the endpoint 108 on the network 114 as well as the network pacing requirements of the network 114.

When the subnetwork object 118 determines that the endpoint object 116 is authorized to deliver a message to an endpoint 108, the subnetwork object 118 notifies the endpoint object 116 via inter-process communication or a remote procedure call. Upon receiving a notification that the endpoint object 116 is authorized to deliver a message to the endpoint 108, in some cases, the endpoint object 116 establishes a communication session with the network provider gateway 106 and transmits the message to the network provider gateway 106, which forwards the message to an endpoint 108 via network 114. In other cases, the endpoint object 116 sends the message to the endpoint 108 at a network address associated with the endpoint 108 in a user datagram protocol (UDP) or transmission control protocol (TCP) session.

The network abstraction layer 109 also processes messages sent by an endpoint 108 to the endpoint infrastructure management system 104. A message sent by an endpoint 108 is forwarded by the network provider gateway 106 to the network abstraction computing environment 102, which provides the message to the network abstraction layer 109 associated with network 114. Based upon the identifier of the endpoint 108 embedded in the message, the network abstraction layer 109 determines whether an endpoint object 116 corresponding to the endpoint 108 already exists. If an endpoint object 116 corresponding to endpoint 108 exists, the network abstraction layer 109 provides the incoming message to the endpoint object 116, which routes the message to the endpoint infrastructure management system 104. If the message from the endpoint 108 is unsolicited, meaning the message is not sent in response to a communication from the endpoint infrastructure management system 104 to the endpoint 108 or an endpoint object 116 does not already exist within the network abstraction layer 109 that corresponds to the endpoint 108, the network abstraction layer 109 creates a new endpoint object 116 or forwards the message to an unsolicited messaging queue without creating an endpoint object 116. The endpoint infrastructure management system 104 can retrieve messages from the unsolicited messaging and determine whether a respective message originates from an endpoint 108 that is authorized to communicate with the network abstraction computing environment 102. If the endpoint infrastructure management system 104 determines that the sending endpoint 108 is authorized, the endpoint infrastructure management system 104 requests network abstraction computing environment 102 to configure an endpoint object 116 corresponding to the endpoint 108. Then, the endpoint object 116 associated with the endpoint 108 determines a destination of the message from the endpoint 108 and forwards the message to the appropriate endpoint infrastructure management system 104.

The one or more endpoints 108 are in communication with a network provider gateway 106 via network 114. Each of the endpoints 108 represents a utility metering device that is coupled to, or included within, a utility distribution infrastructure. Endpoints 108 can also represent other types of devices, such as streetlights or other IoT devices connected to the network 114. In such embodiments, the endpoint 108 monitors consumption of a utility commodity (e.g., water, gas, electricity, etc.). In some implementations, other endpoints can be deployed according to embodiments of the disclosure aside from endpoints 108. Other examples of endpoints include streetlights or IoT sensors.

Network 114 represents a wired or wireless network provided by a network provider on which the one or more endpoints 108 communicate with the network abstraction computing environment 102 via the network provider gateway 106. For example, network 114 includes a wireless cellular network operated by a wireless network provider or a mesh network in which the endpoints 108 operate as nodes of the network.

The network provider gateway 106 is a system provided by a network facilitating communication to devices on network 114. The network provider gateway 106 provides one or more protocols or APIs that are exposed to clients of network 114 to communicate with devices, such as endpoints 108, that are connected to network 114. In some examples, the network provider gateway 106 notifies the endpoint object 116 or the subnetwork object 118 when a particular endpoint 108 on network 114 is reachable according to the network pacing requirements of network 114, and the subnetwork object 118 schedules delivery of the message according to the pacing requirements of network 114.

Computing Device

Figure 2:
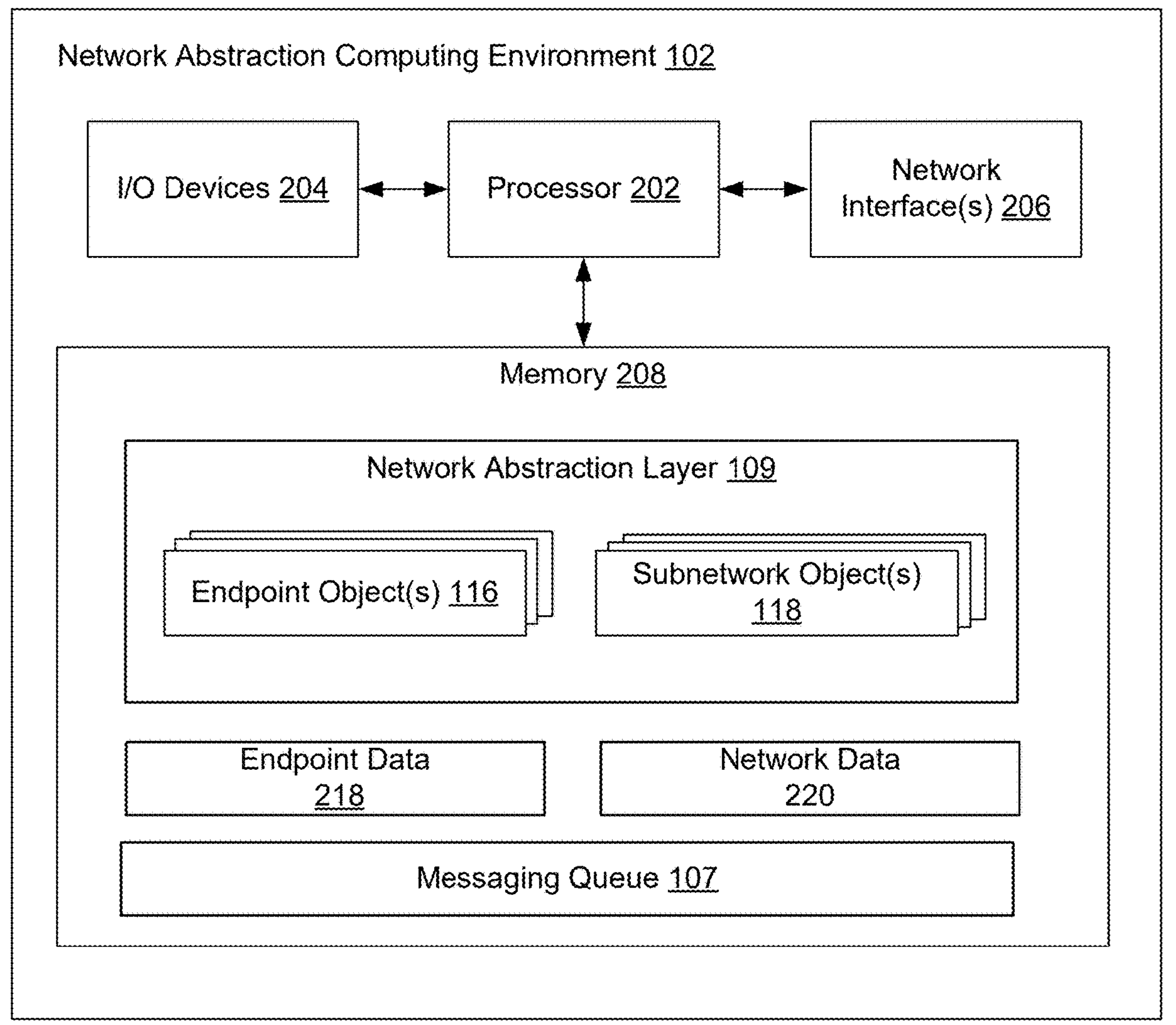
FIG. 2 illustrates a network abstraction computing environment, according to various embodiments.

FIG. 2 illustrates a more detailed view of the network abstraction computing environment 102, according to various embodiments. In some embodiments the network abstraction computing environment 102 is a computing device, such as a backend server, or some other computing device, located at an office or other facility of a utility provider. In some embodiments, the network abstraction computing environment 102 and endpoint infrastructure management system 104 are implemented in the same computing device or cluster of computing devices. As shown, the network abstraction computing environment 102 includes, without limitation, processor 202, I/O devices 204, one or more network interfaces 206, and memory 208, coupled together. Memory 208 includes, without limitation, one or more endpoint objects 116, one or more subnetwork objects 118, endpoint data 218, and network data 220.

Processor 202 coordinates operations of the network abstraction computing environment 102. In various embodiments, processor 202 includes any hardware configured to process data and execute software applications. The processor 202 can be any technically feasible processing device configured to process data and execute program instructions. For example, processor 202 could include one or more CPUs, DSPs, GPUs, ASICs, FPGAs, microprocessors, microcontrollers, other types of processing units, and/or a combination of different processing units.

I/O devices 204 include devices configured to receive input, devices configured to provide output, and devices configured to both receive input and provide output. The one or more network interfaces 206 are configured to receive messages, transmit messages and/or receive metrology data and/or other messages from devices, such as the endpoint infrastructure management system 104, network provider gateway 106, endpoints 108, and/or other devices associated with utility service providers.

Memory 208 can include any technically feasible storage device, such as a random-access memory (RAM) module, a flash memory unit, a hard disk drive, non-volatile storage, or any other type of memory unit or combination thereof. Memory 208 stores, without limitation, a messaging queue 107, a network abstraction layer 109, endpoint data 218, and network data 220. As shown, the network abstraction layer 109 includes one or more endpoint objects 116 and one or more subnetwork objects 118.

Endpoint data 218 includes information about one or more endpoints 108 that are deployed within endpoint device network environment 100. For example, endpoint data 218 includes a device identifier, such as an IMEI or a unique key that identifies an endpoint 108 within a population of endpoints 108. Endpoint data 218 also specifies the current state of an endpoint 108. Additionally, endpoint data 218 includes information about a network 114 on which an endpoint 108 is deployed. Endpoints 108 can be deployed using different networks 114 operated by different network providers. Endpoint data 218 identifies the specific network 114 on which a given endpoint 108 is deployed. Additionally, endpoint data 218 can specify a portion of network 114 on which a given endpoint 108 is deployed. For example, the portion of network 114 on which an endpoint 108 is deployed includes a tower or sector in the case of a cellular network or a subnet in the case of a mesh network. The portion of network 114 on which a given endpoint 108 is deployed can determine a subnetwork object 118 that should be utilized to facilitate delivery of messages to the endpoint 108.

Network data 220 specifies information about the various networks 114 utilized to deploy endpoints 108. For example, network data 220 specifies a network protocol that identifies how messages or packets should be delivered to a given endpoint 108. Network data 220 specifies whether messages sent to an endpoint 108 should be sent through a network provider gateway 106, sent to an endpoint 108 using a UDP or TCP session, and/or the like. Network data 220 can also specify subnetwork object 118 that are responsible for implementing network pacing requirements for various portions of the network 114.

When executed by processor 202, network abstraction layer 109 facilitates communication between endpoint infrastructure management system 104 and one or more endpoints 108. Network abstraction layer 109 delivers messages to an endpoint 108 on behalf of an endpoint infrastructure management system 104 and delivers messages from an endpoint 108 to the endpoint infrastructure management system 104 or other upstream systems. Network abstraction layer 109 receives or acquires a message from the endpoint infrastructure management system 104 that the endpoint infrastructure management system 104 stores in the messaging queue 107 provided by the network abstraction layer 109. In one example, the message from the endpoint infrastructure management system 104 is a management command sent to an endpoint 108. The network abstraction layer 109 determines an endpoint 108 for which the message is destined based upon a device identifier, IMEI, key, or other unique identifier corresponding to an endpoint 108 in the message. If an endpoint object 116 corresponding to the endpoint 108 has been created or currently exists in memory 208, the network abstraction layer 109 provides the message to the endpoint object 116 corresponding to the endpoint 108. If no endpoint object 116 corresponding to the endpoint 108 has been created or currently exists in memory 208, the network abstraction layer 109 can create a new endpoint object 116 corresponding to the endpoint 108. In some embodiments, the network abstraction layer 109 maintains a pool of endpoint objects 116 that can be reused. In this scenario, the network abstraction computing environment 102 assigns the endpoint 108 to an endpoint object 116 from the pool or to a previously used endpoint object 116 that is no longer being used to send a message to an endpoint 108 or the endpoint infrastructure management system 104. The endpoint object 116 can also be associated with an identifier of the endpoint 108 so that the network abstraction layer 109 can later locate or access the endpoint object 116 for the endpoint 108.

As noted above, an endpoint object 116 is a software component executed by the network abstraction layer 109. The endpoint object 116 corresponds to a particular endpoint 108 and is responsible for ensuring the ability to communicate with the endpoint 108 so that the endpoint infrastructure management system 104 can deliver messages to a particular endpoint 108 and receive messages from the endpoint 108. For example, the endpoint object 116 maintains the ability to communicate with a network provider gateway 106 or the network 114 on which an endpoint 108 is deployed. The endpoint object 116 is also configured with network specific information so that the endpoint object 116 is able to communicate with an endpoint 108 that is deployed on a particular network 114. The network specific information includes transport protocols utilized by the network 114, information about a network provider gateway 106 utilized by the network, and security protocols utilized by the network.

An endpoint infrastructure management system 104 can send various types of messages to an endpoint 108 by placing different messages into the messaging queue 107 of the network abstraction layer 109. The messaging queue 107 represents a messaging bus utilized for communication between the endpoint infrastructure management system 104 and network abstraction layer 109. Communication between endpoint infrastructure management system 104 and network abstraction layer 109 could also be implemented using gRPC calls or a REST API, for example. The messages in the queue correspond to operations that the endpoint infrastructure management system 104 can perform with respect to managing an endpoint 108. To configure an endpoint object 116 with enough information to communicate with a given endpoint 108, the endpoint infrastructure management system 104 sends a set request which performs an update to the complete state of an endpoint 108 within a respective endpoint object 116. As another example, an endpoint infrastructure management system 104 can send a patch request to an endpoint object 116 corresponding to an endpoint 108 to partially alter the state of an endpoint 108 stored in the endpoint object 116, such as modifying certain properties or parameters of the endpoint 108. An endpoint object 116 stores the state corresponding to the set or patch request.

The endpoint infrastructure management system 104 can also send a connect message to an endpoint object 116, which causes the endpoint object 116 to initiate a state machine specific to the network 114 on which a corresponding endpoint 108 is deployed. The state machine implemented by the endpoint object 116 tracks the state of a connection between the endpoint object 116 and the network 114 so that the endpoint object 116 can deliver messages to an endpoint 108 deployed on the network 114. The endpoint infrastructure management system 104 can also send a disconnect message to an endpoint object 116, and the endpoint object 116 causes the endpoint 108 to deregister from network 114 in the case of networks 114 that have a registration requirement. The endpoint object 116 can handle a disconnect request analogously to the connect request as described above. In addition to the above example messages, the endpoint infrastructure management system 104 can also send a generic message payload to an endpoint 108.

As noted above, a message provided by the endpoint infrastructure management system 104 to the messaging queue 107 utilized by the network abstraction layer 109 identifies a destination endpoint 108 by including an identifier of a particular endpoint 108. The network abstraction layer 109 determines, from the endpoint data 218, on which network 114 the destination endpoint 108 is deployed. Depending upon which network 114 the endpoint data 218 identifies for the endpoint 108, the network abstraction layer 109 executes an endpoint object 116 implemented specifically for the network 114 and that corresponds to the endpoint 108 or identifies a previously executed endpoint object 116 in memory 208 that corresponds to the endpoint 108. The endpoint object 116 coordinates access to the endpoint 108 on behalf of the endpoint infrastructure management system 104 as well as providing state and session management for messaging with the endpoint 108.

For example, an endpoint object 116 corresponding to an endpoint 108 can be in an idle state to reflect that the endpoint object 116 is missing information needed to initiate a station machine to perform necessary steps required to communicate with an endpoint 108. An endpoint object 116 can be in a connecting state to reflect that the endpoint object 116 has received required information about an endpoint 108 via one or more set or patch requests and is attempting to communicate with the corresponding endpoint 108. An endpoint object 116 can also be in a suspended state to reflect that the endpoint object 116 has previously connected to an endpoint 108 but is currently unable to communicate with endpoint 108. An endpoint object 116 can be in an authenticating state to reflect that the endpoint object 116 is attempting to authenticate with the network 114. An endpoint object 116 can also be in a connected state to reflect that the endpoint object 116 is able to communicate with an endpoint 108. An endpoint object 116 can also be in a disconnecting state to reflect that the endpoint object 116 is attempting to disconnect from network 114. The endpoint object 116 can further be in a disconnected state to reflect that the endpoint object 116 has successfully disconnected from network 114. Finally, the endpoint object 116 can be in a failed state if the endpoint object 116 has failed to connect to network 114.

By maintaining connectivity with an endpoint 108 to which it is assigned, the endpoint object 116 facilitates delivery of messages to endpoints 108 on behalf of an endpoint infrastructure management system 104 as well as receipt of messages from endpoints 108 on behalf of the endpoint infrastructure management system 104. By maintaining state information for a given endpoint 108, the endpoint object 116 determines whether delivery of messages to the endpoint 108 is possible and respond to the endpoint infrastructure management system 104 with an acknowledgement of message delivery or a message delivery failure based on the state of the endpoint 108.

To facilitate delivery of the message from the endpoint infrastructure management system 104, if the endpoint object 116 is in a connected state, the endpoint object 116 determines from the endpoint data 218 a portion of the network 114 on which the subnetwork object 118 is deployed. Upon determining a portion of a network 114 on which an endpoint 108 is deployed, the endpoint object 116 identifies a subnetwork object 118 that corresponds to the portion of network 114. The endpoint object 116 identifies the appropriate subnetwork object 118 from network data 220. The endpoint object 116 requests the subnetwork object 118 to provide an indication, notice, or alert of when the message can be delivered to the endpoint 108. The subnetwork object 118 executes a scheduler that prioritizes endpoint objects 116 to be notified that messages can be sent to an endpoint 108 based upon network conditions and information received from the subnetwork object 118 when the subnetwork object 118 requested to be scheduled. The endpoint object 116 prioritizes messages to be sent to an endpoint108endpoints 108. In some examples, the subnetwork object 118 schedules messages requested for delivery by the endpoint object 116 on a first-come first-served basis. In other scenarios, the subnetwork object 118 schedules messages based upon a priority of the message indicated by the endpoint infrastructure management system 104.

The subnetwork object 118 also implements network pacing to rate-limit messages sent to a particular portion of network 114 according to network pacing requirements imposed by the network provider and based on the current state of the portion of network 114. For example, network pacing requirements of a network 114 can specify that a utility provider is only permitted to send messages to endpoints 108 at a specified rate per unit of time or subject to bandwidth restrictions. Accordingly, the network abstraction layer 109 executes a subnetwork object 118 for each portion of network 114 for which network pacing requirements are imposed by the network provider so that endpoint objects 116 attempting to send messages to endpoints 108 do not violate these requirements. In certain scenarios, multiple endpoint objects 116 can attempt to send messages to endpoints 108 in a particular portion of the network within a certain time period, so the endpoint objects 116 register with a subnetwork object 118 corresponding to the portion of the network on which an endpoint 108 is deployed. Based upon network conditions and network pacing requirements of the network 114, the subnetwork object 118 notifies a respective endpoint object 116 when the endpoint object 116 is permitted to send a message to an endpoint 108 based on the network pacing requirements of the network 114. By implementing network pacing requirements, the subnetwork object 118 can ensure that messages are sent to the portion of the network 114 assigned to the subnetwork object 118 at a rate that is authorized by the network provider.

Additionally, the subnetwork object 118 can determine when an endpoint 108 is available to receive or transmit messages via the network 114 according to network power saving protocol, such as extended discontinuous reception (eDRX) or power saving mode (PSM). Using these protocols, devices deployed on a cellular network enters a sleep state for extended periods of time to reduce power consumption and awakens at predetermined times to send or receive data on the network 114. The subnetwork object 118 also provides an indication to the endpoint object 116 of the availability of an endpoint 108 according to a power saving protocol.

Therefore, the subnetwork object 118 provides an indication via a callback message or an inter-process communication message to the endpoint object 116 that the endpoint object 116 is authorized to deliver the message to the endpoint 108. Upon receiving the indication from the subnetwork object 118, the endpoint object 116 delivers the message to the endpoint 108. In some cases, the network abstraction computing environment 102 determines that the message can be delivered to the endpoint 108 when network pacing policies are satisfied, bandwidth restrictions are not or will not be exceeded, or other policies imposed by the network provider of the network 114 are satisfied.

If an endpoint 108 corresponding to a message sent by the endpoint infrastructure management system 104 is not in a connected state, the endpoint object 116 attempts to cause the endpoint 108 to connect to the network 114. For example, for networks 114 that have a registration requirement for endpoints 108 to register with a network provider gateway 106, the endpoint object 116 instructs the endpoint 108 to connect to the network 114. If the endpoint 108 successfully connects to the network 114, then the endpoint object 116 requests scheduling of the message from a subnetwork object 118 assigned to the portion of the network 114 on which the endpoint 108 is deployed. If the endpoint 108 does not successfully connect to the network 114, the endpoint object 116 returns an error or message delivery failure to the endpoint infrastructure management system 104. In some implementations, the network abstraction layer 109 can delete or destroy the endpoint object 116 after reporting delivery failure to the endpoint infrastructure management system 104.

The endpoint object 116 within the network abstraction layer 109 delivers messages to an endpoint 108 based upon network-specific requirements. Depending upon the network 114 and requirements imposed by a network provider, a first endpoint object 116 for a first network 114 can deliver messages to an endpoint 108 deployed on the first network 114 differently from a second endpoint object 116 for a second network 114 delivering messages to an endpoint 108 deployed on the second network. For example, one network 114 can require delivery of messages through a network provider gateway 106. Another network 114 can require delivery of messages to an IP address assigned to the endpoint 108 in a TCP session that is established by the endpoint object 116 with the endpoint 108. As another example, a network 114 can require delivery of messages to an endpoint 108 in a UDP message sent to the endpoint 108. In some scenarios, a network provider can require utilizing a network provider gateway 106 that provides application programming interface (API) calls to communicate with endpoints 108 deployed in the network 114 of the network provider. Similarly, as noted above, different networks can also have different network pacing requirements that a subnetwork object 118 for a particular network 114 enforces. Therefore, the network abstraction layer 109 provides for different endpoint object 116 implementations and subnetwork object 118 implementations depending upon the requirements and protocols of the network 114. For example, endpoint objects 116 in the network abstraction layer 109 deal with protocols at multiple levels, such as on a transport layer, such as TCP and UDP, required by a network provider gateway 106. Additionally, endpoint objects in the network abstraction layer 109 further implement higher level application protocols that are utilized to communicate with endpoints 108, such as ANSI C12.22, DLMS, Lightweight M2M, or other application protocols that are utilized to communicate with an manage endpoints 108.

The network abstraction layer 109 also receives incoming messages from endpoints 108 and forwards the messages to the endpoint infrastructure management system 104. The network abstraction layer 109 receives messages from a network provider gateway 106 corresponding to a network 114 or directly from an endpoint 108. The messages include responses to commands or other types of messages sent by the endpoint infrastructure management system 104 to an endpoint 108. The messages could also include metrology data associated with usage of a utility commodity tracked by an endpoint 108 to the endpoint infrastructure management system 104. The network abstraction layer 109 receives a message from an endpoint 108. The network abstraction layer 109 determines a destination of the message, such as the endpoint infrastructure management system 104. The network abstraction layer 109 also determines an identity of an endpoint 108 sending the message based upon an identifier of the sender, such as a network address, device identifier, or IMEI. If an endpoint object 116 corresponding to the endpoint 108 has been created or currently exists in memory 208, the network abstraction layer 109 provides the message to the endpoint object 116 corresponding to the endpoint 108. The network abstraction layer 109 can identify an endpoint object 116 corresponding to the endpoint 108 based upon the identifier of the sender because the endpoint object 116 can utilize the same identifier to uniquely identify the endpoint object 116 with respect to other endpoint objects 116 in memory 208. If no endpoint object 116 corresponding to the endpoint 108 has been created or currently exists in the memory 208, the network abstraction layer 109 creates or execute a new endpoint object 116 corresponding to the endpoint 108 and assigns the new endpoint object 116. The new endpoint object 116 is associated with an identifier or key that matches the endpoint 108.

In some scenarios, an endpoint 108 sends messages to network abstraction layer 109 in parts. Accordingly, the endpoint object 116 assembles messages from message parts or from message packets and forwards an assembled message to the endpoint infrastructure management system 104. Therefore, upon receiving a message, the endpoint object 116 corresponding to the endpoint 108 determines whether all parts of the message have been received. If additional parts of the message are required, the endpoint object 116 requests a subnetwork object 118 corresponding to the portion of the network 114 on which the endpoint 108 is deployed to schedule receipt of one or more remaining message parts. In this scenario, message pacing requirements are also applicable to endpoints 108 that are sending messages to the endpoint infrastructure management system 104. Accordingly, the subnetwork object 118 notifies the endpoint object 116 that the endpoint object 116 is authorized to send a message, at which point the endpoint object 116 requests a subsequent message part from the endpoint 108. The endpoint 108 delivers the subsequent message part to the network abstraction layer 109, which provides the message part to the endpoint object 116 corresponding to the endpoint 108. Once the endpoint object 116 has received all parts corresponding to a message from the endpoint 108, the endpoint object 116 can forward the completed message to the endpoint infrastructure management system 104 or any other upstream system for which the message is destined.

Sending a Message to an Endpoint

Figure 3:
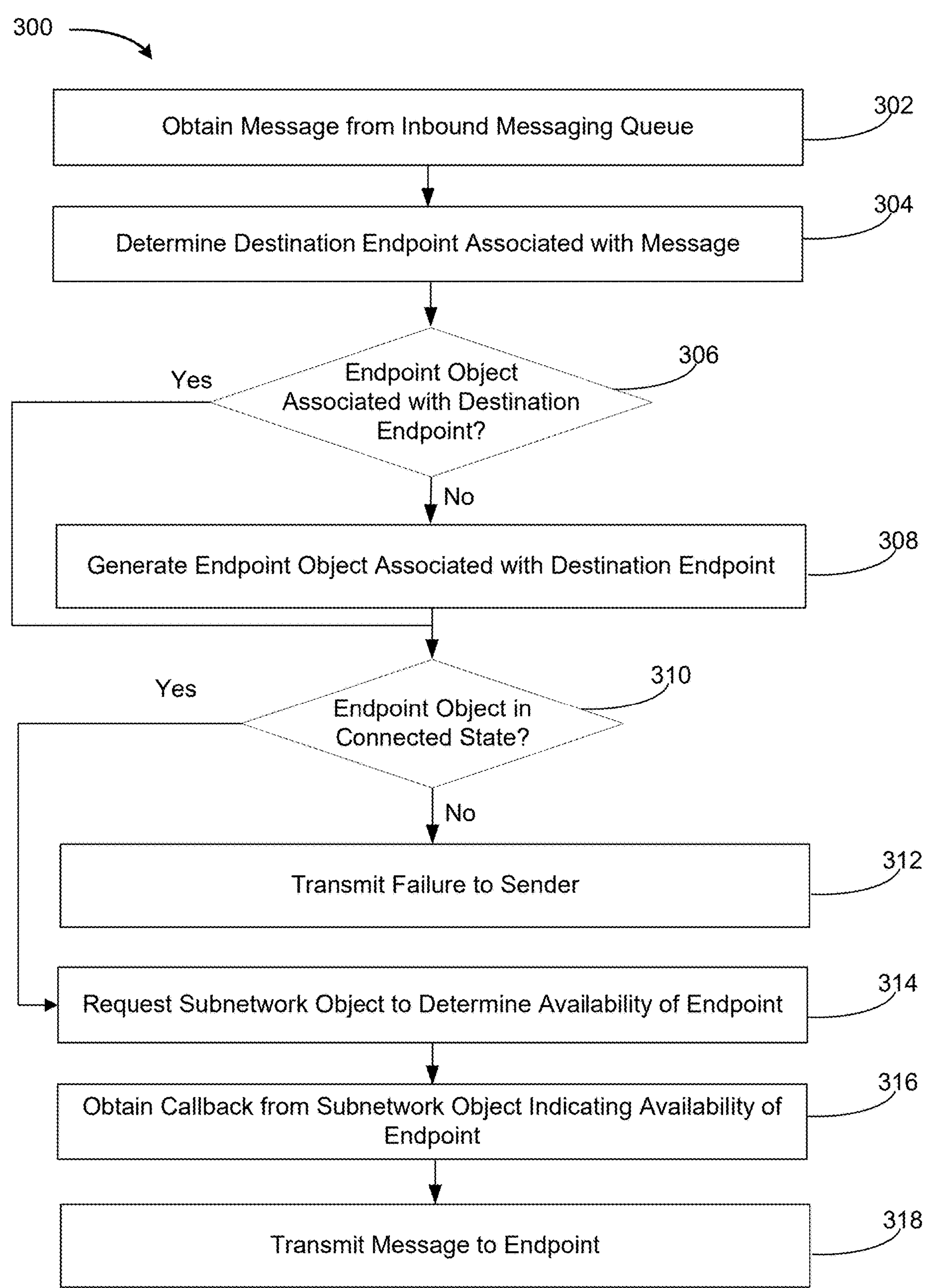
FIG. 3 illustrates a flow diagram of method steps for sending a message to an endpoint using the network abstraction computing environment, according to various embodiments.

FIG. 3 is a flow diagram of method steps for sending a message to an endpoint 108 via the network abstraction computing environment 102, according to various embodiments. Although the method steps of FIG. 3 are described as being performed by the network abstraction computing environment 102, the method steps of FIG. 3 can also be performed, in alternative embodiments, by implementing the network abstraction layer 109 in the endpoint infrastructure management system 104. Furthermore, although the method steps are shown in an order, persons skilled in the art will understand that some method steps may be performed in a different order, repeated, and/or performed by components other than those described in FIG. 3.

As shown, a method 300 begins at step 302, where the network abstraction layer 109 obtains a message from the messaging queue 107. For example, a system such as the endpoint infrastructure management system 104 requires delivery of a message to an endpoint 108 in the endpoint device network environment 100. The endpoint infrastructure management system 104 transmits a message to the messaging queue 107 utilized by the network abstraction layer 109 to receive messages from the endpoint infrastructure management system 104. By providing the messaging queue 107 in which the endpoint infrastructure management system 104 places messages destined for endpoints 108, the network abstraction computing environment 102, executing the network abstraction layer 109, can relieve the endpoint infrastructure management system 104 of the responsibility to interact with one or more networks 114 or network provider gateways 106. The network abstraction layer 109 retrieves messages from the messaging queue 107 in first-in first-out (FIFO) order. In some implementations, the network abstraction layer 109 alternatively retrieves messages that are flagged with a higher priority before messages that are not flagged as high priority.

At step 304, the network abstraction layer 109 determines a destination endpoint 108 associated with a message. The network abstraction layer 109 determines a destination endpoint 108 based upon an identifier or key that uniquely identifies the endpoint 108 that is embedded in the message.

At step 306, the network abstraction layer 109 determines whether an endpoint object 116 corresponding to the endpoint 108 has been created or currently exists in the memory 208 of the network abstraction computing environment 102. An endpoint object 116 is identified based upon the identifier of the endpoint 108 in the message received at step 302. In some examples, the network abstraction layer 109 identifies an endpoint object 116 corresponding to the endpoint 108 by consulting endpoint data 218 to determine whether an endpoint object 116 associated with an identifier of the endpoint 108 has been created. If no endpoint object 116 corresponding to the endpoint 108 has been created or currently exists in memory 208, the method 300 proceeds to step 308. If an endpoint object 116 corresponding to the meter exists in memory 208, the method 300 proceeds to step 310.

At step 308, the network abstraction layer 109 creates or executes a new endpoint object 116 corresponding to the endpoint 108. The endpoint object 116 can also be associated with an identifier of the endpoint 108. The message obtained from the messaging queue 107 is also provided to the created endpoint object 116. The endpoint object 116 is responsible for delivery of the message to the endpoint 108 and for maintaining a session with the endpoint 108. The endpoint object 116 is also responsible for determining the state of an endpoint 108 to facilitate communication with the endpoint 108.

At step 310, the endpoint object 116 determines whether the state of endpoint 108 as represented in the endpoint object 116 is in a connected state. If the endpoint object 116 is in a connected state, the method 300 can proceed to step 314. If the endpoint object 116 is not in a connected state, endpoint 108 the method 300 proceeds to step 312.

At step 312, the endpoint object 116 reports a delivery failure of the message to the sender, or to the endpoint infrastructure management system 104. In some implementations, the network abstraction layer 109 can delete or destroy the endpoint object 116 after reporting delivery failure to the endpoint infrastructure management system 104.

At step 314, the endpoint object 116 requests a subnetwork object 118 corresponding to a portion of the network 114 on which the endpoint 108 is deployed to provide an indication of when the message can be delivered to the endpoint 108. As described above, the subnetwork object 118 executes a scheduler that prioritizes requests from endpoint objects 116 to deliver messages to endpoints 108 that are deployed on the portion of the network 114 to which the subnetwork object 118 is assigned. In some examples, the subnetwork object 118 schedules messages requested for delivery by the endpoint object 116 on a first-come first-served basis. In other scenarios, the subnetwork object 118 schedules messages based upon a priority of the message indicated by the endpoint infrastructure management system 104.

At step 316, the endpoint object 116 obtains the indication via a callback message or an inter-process communication message from the subnetwork object 118 that the endpoint object 116 is authorized to deliver the message to the endpoint 108. The subnetwork object 118 provides the indication upon determining that the message is authorized for delivery according to network pacing requirements imposed by the network provider for the portion of the network 114 on which the endpoint 108 is deployed. Upon receiving the indication from the subnetwork object 118, the endpoint object 116 delivers the message to the endpoint 108.

At step 318, the endpoint object 116 transmits the message to the endpoint 108. As noted above, the mechanism by which the endpoint object 116 delivers the message to the endpoint 108 varies among different networks 114 that are operated by different network providers. Some networks 114 can require delivery of messages through a network provider gateway 106. Another network 114 can require delivery of messages to an IP address assigned to the endpoint 108 in a TCP session that is established by the endpoint object 116. Another network 114 can require delivery of messages to an endpoint 108 in a UDP message sent to the endpoint 108. In some networks 114, a network provider can require utilizing a network provider gateway 106 that provides specific application programming interface (API) calls to communicate with endpoints 108 deployed in the network 114 of the network provider.

Receiving a Message from an Endpoint

Figure 4:
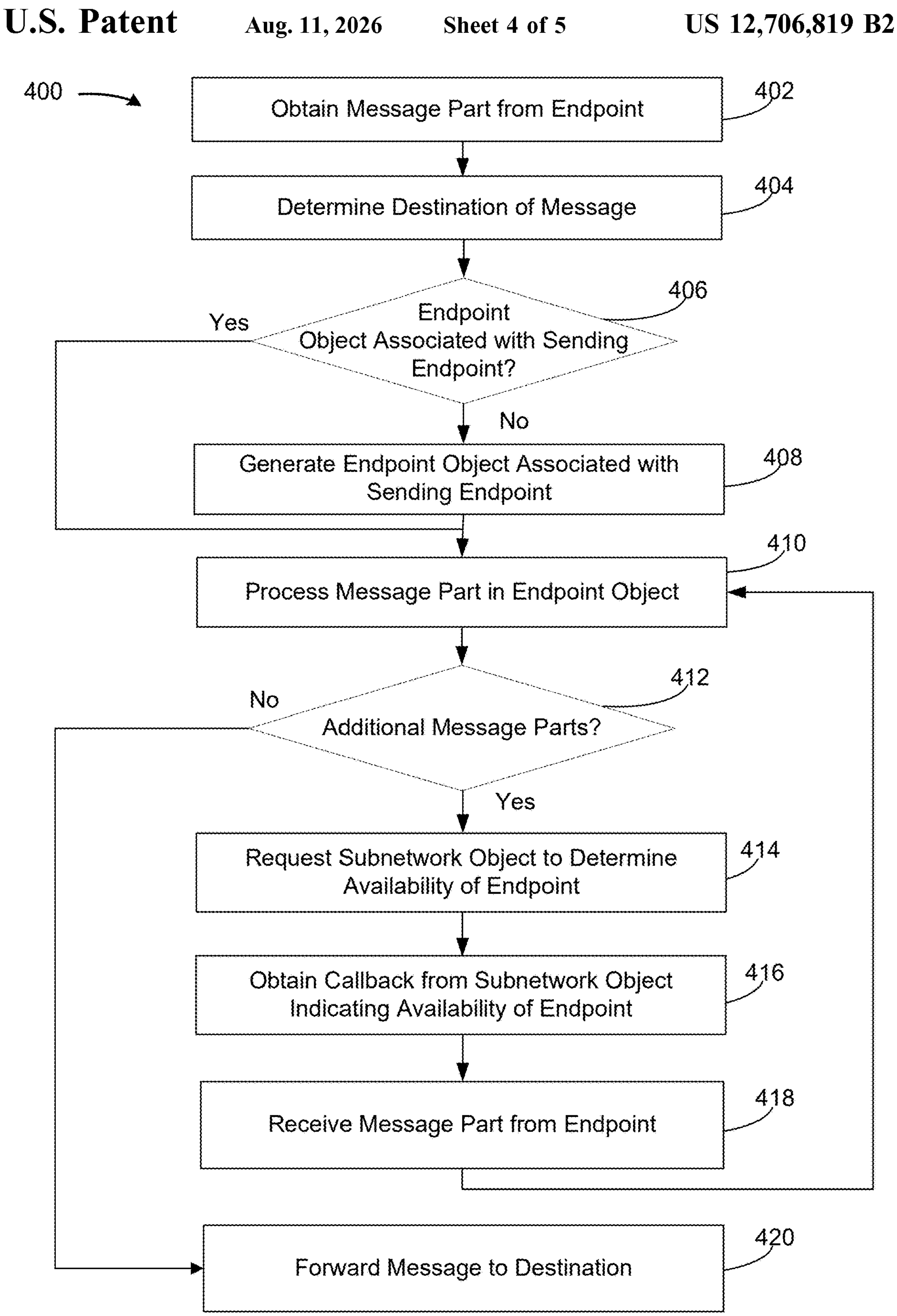
FIG. 4 illustrates a flow diagram of method steps for receiving a message from an endpoint using the network abstraction computing environment, according to various embodiments.

FIG. 4 is a flow diagram of method steps for receiving a message from an endpoint 108 via the network abstraction computing environment 102, according to various embodiments. Although the method steps of FIG. 4 are described as being performed by the network abstraction computing environment 102, the method steps of FIG. 4 can also be performed, in alternative embodiments, by implementing the network abstraction layer 109 in the endpoint infrastructure management system 104. Furthermore, although the method steps are shown in an order, persons skilled in the art will understand that some method steps may be performed in a different order, repeated, and/or performed by components other than those described in FIG. 4.

As shown, a method 400 begins at step 402, where the network abstraction layer 109 obtains a message from an endpoint 108. The endpoint 108 sends messages to the network abstraction layer 109 via a network 114 on which the endpoint 108 is deployed utilizing network protocols specified by the network provider. The message is sent to the network abstraction layer 109 via the network provider gateway 106 or directly to the network abstraction layer 109 in a TCP session or via a UDP message.

At step 404, the network abstraction layer 109 determines a source endpoint 108 associated with a message. The network abstraction layer 109 determines whether the message is destined for the endpoint infrastructure management system 104 or an alternative upstream or management system associated with the endpoint device network environment 100.

At step 406, the network abstraction layer 109 determines whether an endpoint object 116 corresponding to the endpoint 108 has been created or currently exists in the memory 208 of the network abstraction computing environment 102. An endpoint object 116 is identified based upon the identifier of the endpoint 108 in the message received at step 402. In some examples, the network abstraction layer 109 identifies an endpoint object 116 corresponding to the endpoint 108 by consulting endpoint data 218 to determine whether an endpoint object 116 associated with an identifier of the endpoint 108 has been created. If no endpoint object 116 corresponding to the endpoint 108 has been created or currently exists in memory 208, the method 400 proceeds to step 408. If an endpoint object 116 corresponding to the meter exists in memory 208, the method 400 proceeds to step 410.

At step 408, the network abstraction layer 109 creates or executes a new endpoint object 116 corresponding to the endpoint 108. The endpoint object 116 can also be associated with an identifier of the endpoint 108. The message obtained from the messaging queue 107 is also provided to the created endpoint object 116.

At step 410, the endpoint object 116 associated with the endpoint 108 obtains the message sent by the endpoint 108 to the network abstraction computing environment 102. The endpoint object 116 processes the message to determine whether the message is one message in a multi-part message. In some cases, the message is a partial message. Accordingly, the endpoint object 116 assembles messages from message parts or from message packets and forwards an assembled message to the endpoint infrastructure management system 104.

At step 412, the endpoint object 116 determines whether there are additional message parts for the message from the endpoint 108. If there are no additional parts to the message, the method 400 proceeds to step 420. If there are additional parts in the message, the method 400 proceeds to step 414.

At step 414, the endpoint object 116 requests a subnetwork object 118 corresponding to the portion of the network 114 on which the endpoint 108 is deployed to schedule receipt of one or more remaining message parts. As noted above, message pacing requirements are also applicable to endpoints 108 that are sending messages to the endpoint infrastructure management system 104.

At step 416, the endpoint object 116 obtains a callback message from the subnetwork object 118 when the endpoint 108 is authorized to deliver a subsequent message part. The subnetwork object 118 can alert the endpoint object 116 via a remote procedure call or an inter-process communication message.

At step 418, the endpoint object 116 receives the subsequent message part from the endpoint 108. The method 400 proceeds from step 418 to step 412, where the endpoint object 116 determines whether there are additional message parts. If there are no additional message parts, the method 400 proceeds from step 412 to step 420.

At step 420, once the endpoint object 116 has received all parts corresponding to a message from the endpoint 108, the endpoint object 116 can forward the completed message to the endpoint infrastructure management system 104 or any other upstream system for which the message is destined.

System Overview

Figure 5:
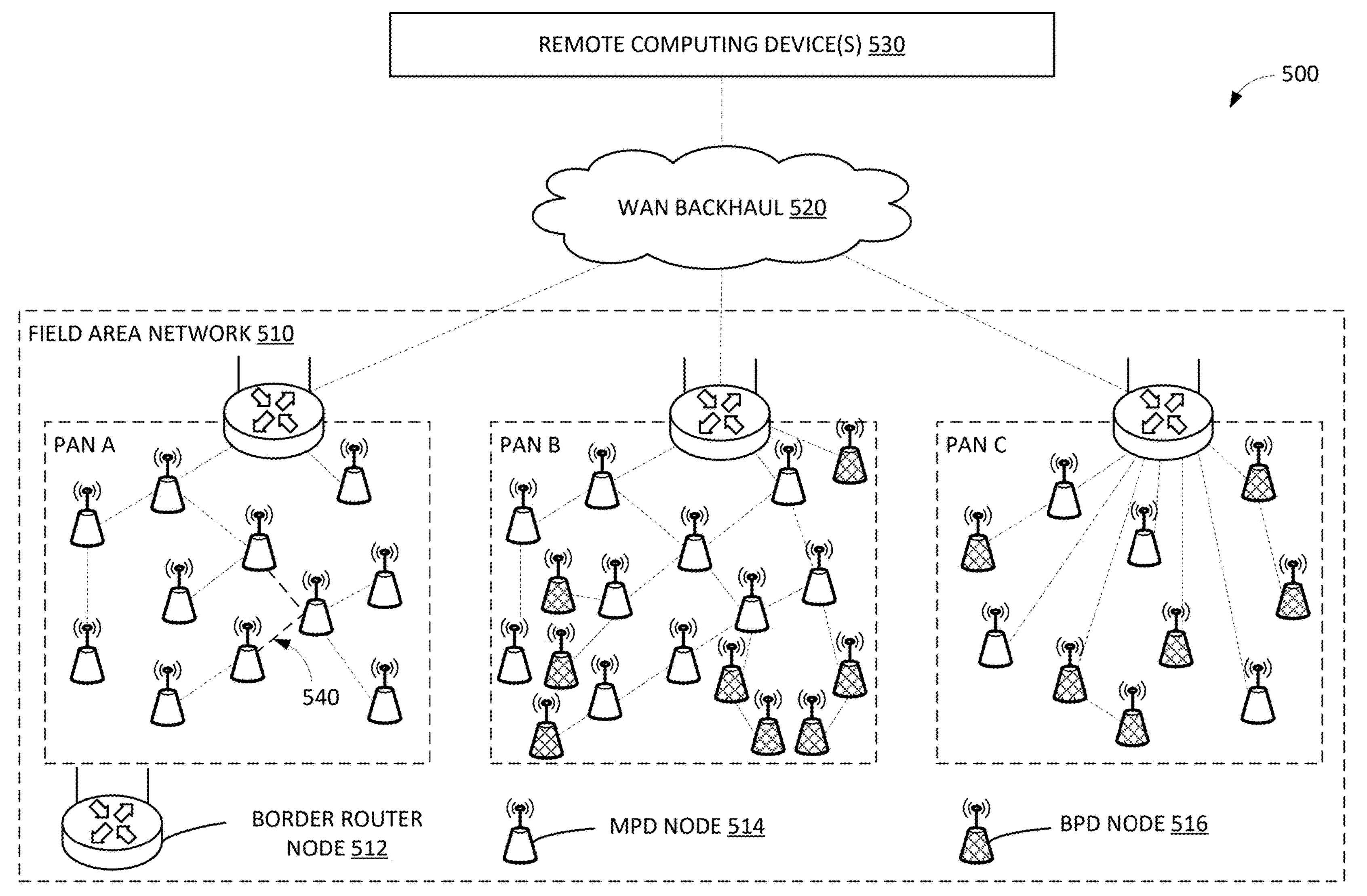
FIG. 5 illustrates a network system configured to implement one or more aspects of the various embodiments.

FIG. 5 illustrates a network system configured to implement one or more aspects of the various embodiments. As shown, network system 500 includes a field area network (FAN) 510, a wide area network (WAN) backhaul 520, and one or more remote computing devices 530. FAN 510 is coupled to remote computing device(s) 530 via WAN backhaul 520.

FAN 510 includes personal area network (PANs) A, B, and C. PANs A and B are organized according to a mesh network topology, while PAN C is organized according to a star network topology. Each of PANs A, B, and C includes various network devices including at least one border router node 512 and one or more mains-powered device (MPD) nodes 514. PANs B and C further include one or more battery-powered device (BPD) nodes 516. Any of the one or more MPD nodes 514 or the BPD nodes 516 can be used to implement the techniques discussed above with respect to FIGS. 1-4. In various embodiments, nodes 514 or 516 can be implemented as endpoints 108 or the network abstraction computing environment 102. In some embodiments, nodes 514 or 516 can be implemented as some other suitable communication devices, such as endpoints 108. FAN 510 and WAN backhaul 520 can be implemented as a portion of network 114 and include, in some embodiments, a network provider gateway 106.

MPD nodes 514 draw power from an external power source, such as mains electricity or a power grid. MPD nodes 514 typically operate on a continuous basis without powering down for extended periods of time. BPD nodes 516 draw power from an internal power source, such as a battery. BPD nodes 516 typically operate intermittently and power down, go to very low power mode, for extended periods of time in order to conserve battery power.

MPD nodes 514 and BPD nodes 516 are coupled to, or included within, a utility distribution infrastructure (not shown) that distributes a resource to consumers. MPD nodes 514 and BPD nodes 516 gather sensor data related to the distribution of the resource, process the sensor data, and communicate processing results and other information to remote computing device(s) 530. Border router nodes 512 operate as access points to provide MPD nodes 514 and BPD nodes 516 with access to remote computing device(s) 530.

Any of border router nodes 512, MPD nodes 514, and BPD nodes 516 are configured to communicate directly with one or more adjacent nodes via bi-directional communication links 540. The communication links 540 may be wired or wireless links, although in practice, adjacent nodes of a given PAN exchange data with one another by transmitting data packets via wireless radio frequency (RF) communications. The various node types are configured to perform a technique known in the art as "channel hopping" in order to periodically receive data packets on varying channels. As known in the art, a "channel" may correspond to a particular range of frequencies. In one embodiment, a node may compute a current receive channel by evaluating a Jenkins hash function based on a total number of channels and the media access control (MAC) address of the node.

In some examples, MPD nodes 514 or BPD nodes 516 can communicate directly with remote computing devices 530 via respective cellular communication links. In such examples, MPD nodes 514 or BPD nodes 516 can transmit messages to and/or receive messages from remote computing devices 530 without using border router nodes 512. Furthermore, in some examples, remote computing devices 530 are implemented as MPD nodes 514 or BPD nodes 516. In such examples, MPD nodes 514 and BPD nodes 516 can perform the control and/or data analysis functions described herein with respect to remote computing devices 530.

In some examples, each node within a given PAN can implement a discovery protocol to identify one or more adjacent nodes or "neighbors." A node that has identified an adjacent, neighboring node can establish a bi-directional communication link 540 with the neighboring node. Each neighboring node may update a respective neighbor table to include information concerning the other node, including one or more of the MAC address of the other node, listening schedule information for the other node, a received signal strength indication (RSSI) of the communication link 540 established with that node, and the like.

Nodes can compute the channel hopping sequences of adjacent nodes to facilitate the successful transmission of data packets to those nodes. In embodiments where nodes implement the Jenkins hash function, a node computes a current receive channel of an adjacent node using the total number of channels, the MAC address of the adjacent node, and a time slot number assigned to a current time slot of the adjacent node.

Any of the nodes discussed above may operate as a source node, an intermediate node, or a destination node for the transmission of data packets. A given source node can generate a data packet and then transmit the data packet to a destination node via any number of intermediate nodes (in mesh network topologies). The data packet can indicate a destination for the packet and/or a particular sequence of intermediate nodes to traverse in order to reach the destination node. In one embodiment, each intermediate node can include a forwarding database indicating various network routes and cost metrics associated with each route.

Nodes can transmit messages and/or data packets across a given PAN and across WAN backhaul 520 to remote computing device(s) 530. Similarly, remote computing device(s) 530 can transmit messages and/or data packets across WAN backhaul 520 and across any given PAN to a particular node included therein. As a general matter, numerous routes can exist which traverse any of PANs A, B, and C and include any number of intermediate nodes, thereby allowing any given node or other component within network system 500 to communicate with any other node or component included therein.

Remote computing device(s) 530 includes one or more server machines (not shown) or other computing devices configured to operate as sources for, or destinations of, messages and/or data packets that traverse within network system 500. The server machines can query nodes within network system 500 to obtain various data, including raw or processed sensor data, power consumption data, node/network throughput data, status information, and so forth. The server machines can also transmit commands and/or program instructions to any node within network system 500 to cause those nodes to perform various operations. In one embodiment, each server machine is a computing device configured to execute, via a processor, a software application stored in a memory to perform various network management and/or earthquake classification operations. In various embodiments, endpoint infrastructure management system 104 and network abstraction computing environment 102 are implemented as remote computing device(s) 530.

In sum, techniques are disclosed herein that enable communication between an endpoint infrastructure management system and endpoints. According to various embodiments, a message for transmission to an endpoint is received from a messaging queue. A network to which the endpoint is connected is determined, and an endpoint object corresponding to the endpoint is created or identified. The endpoint object is configured with network specific information associated with the network. When an indication that the message can be delivered to the endpoint via the network is received from a subnetwork object, the endpoint object transmits the message to the endpoint using the network.

At least one technical advantage of the disclosed techniques is that the disclosed techniques enable the metering or other endpoint devices to be managed by one or more management systems, such as endpoint device management systems, where the endpoint devices are deployed in a heterogeneous network environment that involves different networks provided by different network providers without the management systems having to be aware of the specific network details, configurations, or statuses. Additionally, as new network providers or new types of networks are added to the environment, a network abstraction layer can handle communications via these new networks so that upstream management systems can continue to communicate with endpoint devices using these new network protocols or standards without having to be updated to handle new network protocols or standards.

1. In some embodiments, a method comprises receiving, by a computing device, a first message for transmission to a first endpoint from a messaging queue, determining, by the computing device, a first network to which the first endpoint is connected, identifying, by the computing device, a first endpoint object corresponding to the first endpoint, the first endpoint object being configured with network specific information associated with the first network, receiving, by the first endpoint object executing on the computing device from a subnetwork object executing on the computing device, an indication that the first message can be delivered to the first endpoint via the first network, and in response to the indication, transmitting, by the first endpoint object, the first message to the first endpoint using the first network.

2. The method of clause 1, wherein the first endpoint comprises a metering device that collects metrology data.

3. The method of clauses 1 or 2, wherein the network specific information associated with the first network comprises a transport protocol utilized by the first network, the transport protocol being a transmission control protocol (TCP) or a user datagram protocol (UDP).

4. The method of any of clauses 1-3, wherein transmitting the first message to the first endpoint using the first network comprises transmitting the first message to a network provider gateway providing access to the first network.

5. The method of any of clauses 1-4, further comprising receiving, by the computing device, a second message from the first endpoint via the first network, identifying, by the computing device, the first endpoint object associated with the first endpoint from a plurality of endpoint objects executed by the computing device, providing, by the computing device, the second message to the first endpoint object associated with the first endpoint, and forwarding, by the first endpoint object executing on the computing device, the second message to a destination specified in the second message.

6. The method of any of clauses 1-5, wherein the second message comprises metrology data associated with the first endpoint and the destination comprises an endpoint infrastructure management system that utilizes the metrology data.

7. The method of any of clauses 1-6, wherein the subnetwork object executing on the computing device generates the indication that the first message can be delivered to the first endpoint via the first network in response to determining that network pacing requirements of the first network are satisfied.

8. The method of any of clauses 1-7, wherein the subnetwork object executing on the computing device generates the indication that the first message can be delivered to the first endpoint via the first network in response to determining that a bandwidth restriction associated with a portion of the first network will not be exceeded.

9. The method of any of clauses 1-8, further comprising receiving, by the computing device, a second message for transmission to a second endpoint from the messaging queue, determining, by the computing device, a second network to which the second endpoint is connected, creating, by the computing device, a second endpoint object corresponding to the second endpoint, the second endpoint object being configured with network specific information associated with the second network, wherein the second network is different from the first network, receiving, by the second endpoint object executing on the computing device from a second subnetwork object executing on the computing device, a second indication that the second message can be delivered to the second endpoint via the second network, and in response to the second indication, transmitting, by the second endpoint object, the second message to the second endpoint using the second network.

10. The method of any of clauses 1-9, further comprising receiving, by the computing device, a second message for transmission to the first endpoint from the messaging queue, identifying, by the computing device, the first endpoint object associated with the first endpoint, receiving, by the first endpoint object executing on the computing device from the subnetwork object executing on the computing device, a second indication that the second message can be delivered to the first endpoint via the first network, and in response to the second indication, transmitting, by the first endpoint object, the second message to the first endpoint using the first network.

11. The method of any of clauses 1-10, wherein the first network comprises a cellular network.

12. In some embodiments, a computing system comprises one or more processors, and a memory storing executable instructions that, when executed by the one or more processors, cause the one or more processors to perform operations comprising acquiring a first message to be provided to an endpoint, identifying a network to which the endpoint is connected, identifying a first software component corresponding to the endpoint, the first software component being configured with network specific information associated with the network, and in response to receiving, by the first software component executing on the computing system from a second software component executing on the computing system, a first notice that the first message can be delivered to the endpoint via the network, sending, by the first software component, the first message to the endpoint via the network.

13. The computing system of clause 12, wherein the second software component provides the notice to the first software component in response to determining that the endpoint is awake and can receive messages.

14. The computing system of clauses 12 or 13, wherein the second software component further determines that the endpoint is awake according to at least one of extended discontinuous reception (eDRX) or power saving mode (PSM).

15. The computing system of any of clauses 12-14, wherein the operations further cause the one or more processors to perform operations comprising acquiring a second message from the endpoint via the network, identifying the first software component associated with the endpoint from a plurality of first software components executed by the computing system, providing the second message to the first software component associated with the endpoint, wherein the first software component determines that the second message comprises a subsequent message part, obtaining, by the first software component executing on the computing system from the second software component executing on the computing system, a second notice that the subsequent message part can be obtained from the endpoint via the network, and in response to the second notice, acquiring, by the first software component, the subsequent message part from the endpoint via the network.

16. The computing system of any of clauses 12-15, wherein the executable instructions, when executed, cause the one or more processors to acquire the first message from a messaging queue, wherein an endpoint infrastructure management system places the first message into the messaging queue.

17. In some embodiments, one or more non-transitory computer-readable media store instructions which, when executed by one or more processors of a computing environment, cause the one or more processors to perform operations comprising extracting, from a queue, a first message addressed to an endpoint, determining a network on which the endpoint is located, identifying an endpoint object for communicating with the endpoint, requesting, by the endpoint object executing in the computing environment, a signal from a subnetwork object executing in the computing environment that the first message can be delivered to the endpoint, receive, by the endpoint object executing in the computing environment from the subnetwork object, the signal that the first message can be delivered to the endpoint, and in response to the signal, transmit, by the endpoint object, the first message to the endpoint using the network.

18. The one or more non-transitory computer-readable media of clause 17, wherein transmitting the first message to the endpoint using the network comprises transmitting the first message to a network provider gateway associated with the network.

19. The one or more non-transitory computer-readable media of clauses 17 or 18, wherein the operations further comprise obtaining a second message from the endpoint via the network, determining the endpoint object associated with the endpoint from a plurality of endpoint objects, providing the second message to the endpoint object associated with the endpoint, and transmitting, by the endpoint object, the second message to a destination specified in the second message.

20. The one or more non-transitory computer-readable media of any of clauses 17-19, wherein the first message comprises a management command from an endpoint infrastructure management system to the endpoint.

21. The one or more non-transitory computer-readable media of any of clauses 17-20, wherein the subnetwork object generates the signal that the first message can be delivered to the endpoint via the network in response to determining that one or more policies associated with the network are satisfied.

Any and all combinations of any of the claim elements recited in any of the claims and/or any elements described in this application, in any fashion, fall within the contemplated scope of the present protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments can be embodied as a system, method or computer program product. Accordingly, aspects of the present disclosure can take the form of an entirely hardware embodiment, an entirely software embodiment (including firmware, resident software, micro-code, etc.) or an embodiment combining software and hardware aspects that can all generally be referred to herein as a "module," a "system," or a "computer." In addition, any hardware and/or software technique, process, function, component, engine, module, or system described in the present disclosure can be implemented as a circuit or set of circuits. Furthermore, aspects of the present disclosure can take the form of a computer program product embodied in one or more computer readable media having computer readable program code embodied thereon.

Any combination of one or more computer readable media can be utilized. The computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors can be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure can be devised without departing from the basic scope thereof, and the scope thereof is determined by the claims that follow. Moreover, in the above description, numerous specific details are set forth to provide a more thorough understanding of the various embodiments. However, it will be apparent to one skilled in the art that the inventive concepts may be practiced without one or more of these specific details.

What is claimed is:

1. A method comprising:

receiving, by a computing device, a first message for transmission to a first endpoint from a messaging queue;

determining, by the computing device, a first network to which the first endpoint is connected;

identifying, by the computing device, a first endpoint object corresponding to the first endpoint, the first endpoint object being configured with network specific information associated with the first network;

receiving, by the first endpoint object executing on the computing device from a subnetwork object executing on the computing device, an indication that the first message can be delivered to the first endpoint via the first network based on at least one of a network pacing requirement of the first network or a reachability state of the first endpoint; and in response to the indication, transmitting, by the first endpoint object, the first message to the first endpoint using the first network.

2. The method of claim 1, wherein the first endpoint comprises a metering device that collects metrology data.

3. The method of claim 1, wherein the network specific information associated with the first network comprises a transport protocol utilized by the first network, the transport protocol being a transmission control protocol (TCP) or a user datagram protocol (UDP).

4. The method of claim 1, wherein transmitting the first message to the first endpoint using the first network comprises transmitting the first message to a network provider gateway providing access to the first network.

5. The method of claim 1, further comprising:

receiving, by the computing device, a second message from the first endpoint via the first network;

identifying, by the computing device, the first endpoint object associated with the first endpoint from a plurality of endpoint objects executed by the computing device;

providing, by the computing device, the second message to the first endpoint object associated with the first endpoint; and forwarding, by the first endpoint object executing on the computing device, the second message to a destination specified in the second message.

6. The method of claim 5, wherein the second message comprises metrology data associated with the first endpoint and the destination comprises an endpoint infrastructure management system that utilizes the metrology data.

7. The method of claim 1, wherein the subnetwork object executing on the computing device generates the indication that the first message can be delivered to the first endpoint via the first network in response to determining that network pacing requirements of the first network are satisfied.

8. The method of claim 1, wherein the subnetwork object executing on the computing device generates the indication that the first message can be delivered to the first endpoint via the first network in response to determining that a bandwidth restriction associated with a portion of the first network will not be exceeded.

9. The method of claim 1, further comprising:

receiving, by the computing device, a second message for transmission to a second endpoint from the messaging queue;

determining, by the computing device, a second network to which the second endpoint is connected;

creating, by the computing device, a second endpoint object corresponding to the second endpoint, the second endpoint object being configured with network specific information associated with the second network, wherein the second network is different from the first network;

receiving, by the second endpoint object executing on the computing device from a second subnetwork object executing on the computing device, a second indication that the second message can be delivered to the second endpoint via the second network; and in response to the second indication, transmitting, by the second endpoint object, the second message to the second endpoint using the second network.

10. The method of claim 1, further comprising:

receiving, by the computing device, a second message for transmission to the first endpoint from the messaging queue;

identifying, by the computing device, the first endpoint object associated with the first endpoint;

receiving, by the first endpoint object executing on the computing device from the subnetwork object executing on the computing device, a second indication that the second message can be delivered to the first endpoint via the first network; and in response to the second indication, transmitting, by the first endpoint object, the second message to the first endpoint using the first network.

11. The method of claim 1, wherein the first network comprises a cellular network.

12. A computing system, comprising:

one or more processors; and a memory storing executable instructions that, when executed by the one or more processors, cause the one or more processors to perform operations comprising:

acquiring a first message to be provided to an endpoint;

identifying a network to which the endpoint is connected;

identifying a first software component corresponding to the endpoint, the first software component being configured with network specific information associated with the network; and in response to receiving, by the first software component executing on the computing system from a second software component executing on the computing system, a first notice that the first message can be delivered to the endpoint via the network, sending, by the first software component, the first message to the endpoint via the network, wherein the first notice is based on at least one of a network pacing requirement of the network or a reachability state of the endpoint.

13. The computing system of claim 12, wherein the second software component provides the notice to the first software component in response to determining that the endpoint is awake and can receive messages.

14. The computing system of claim 13, wherein the second software component further determines that the endpoint is awake according to at least one of extended discontinuous reception (eDRX) or power saving mode (PSM).

15. The computing system of claim 12, wherein the operations further cause the one or more processors to perform operations comprising:

acquiring a second message from the endpoint via the network;

identifying the first software component associated with the endpoint from a plurality of first software components executed by the computing system;

providing the second message to the first software component associated with the endpoint, wherein the first software component determines that the second message comprises a subsequent message part;

obtaining, by the first software component executing on the computing system from the second software component executing on the computing system, a second notice that the subsequent message part can be obtained from the endpoint via the network; and in response to the second notice, acquiring, by the first software component, the subsequent message part from the endpoint via the network.

16. The computing system of claim 12, wherein the executable instructions, when executed, cause the one or more processors to acquire the first message from a messaging queue, wherein an endpoint infrastructure management system places the first message into the messaging queue.

17. One or more non-transitory computer-readable media storing instructions which, when executed by one or more processors of a computing environment, cause the one or more processors to perform operations comprising:

extracting, from a queue, a first message addressed to an endpoint;

determining a network on which the endpoint is located;

identifying an endpoint object for communicating with the endpoint;

requesting, by the endpoint object executing in the computing environment, a signal from a subnetwork object executing in the computing environment that the first message can be delivered to the endpoint;

receive, by the endpoint object executing in the computing environment from the subnetwork object, the signal that the first message can be delivered to the endpoint based on at least one of a network pacing requirement of the network or a reachability state of the endpoint; and in response to the signal, transmit, by the endpoint object, the first message to the endpoint using the network.

18. The one or more non-transitory computer-readable media of claim 17, wherein transmitting the first message to the endpoint using the network comprises transmitting the first message to a network provider gateway associated with the network.

19. The one or more non-transitory computer-readable media of claim 17, wherein the operations further comprise:

obtaining a second message from the endpoint via the network;

determining the endpoint object associated with the endpoint from a plurality of endpoint objects;

providing the second message to the endpoint object associated with the endpoint; and transmitting, by the endpoint object, the second message to a destination specified in the second message.

20. The one or more non-transitory computer-readable media of claim 17, wherein the first message comprises a management command from an endpoint infrastructure management system to the endpoint.

21. The one or more non-transitory computer-readable media of claim 17, wherein the subnetwork object generates the signal that the first message can be delivered to the endpoint via the network in response to determining that one or more policies associated with the network are satisfied.

* * * * *